United States Patent [19]

Young

[11] Patent Number: 5,067,597

[45] Date of Patent: Nov. 26, 1991

[54] HUB AND EXCITER RING ASSEMBLY

[76] Inventor: Warren J. Young, 9 Becket St., Lake Oswego, Oreg. 97034

[21] Appl. No.: 398,709

[22] Filed: Aug. 25, 1989

[51] Int. Cl.$^5$ .............................................. B60T 8/32
[52] U.S. Cl. ................................ 188/181 R; 310/168; 324/174
[58] Field of Search ............ 188/181 A, 181 R, 18 A, 188/18 R, 344; 303/91, 113; 310/168, 261; 164/112, 113, 111; 324/174, 173

[56] References Cited

U.S. PATENT DOCUMENTS

| 3,307,423 | 3/1967 | Dansi . |
| 3,848,147 | 11/1974 | Anselmino .................. 188/181 R X |
| 3,887,046 | 3/1975 | Bueler . |
| 3,921,702 | 11/1975 | Ward, III . |
| 3,998,298 | 12/1976 | Fleagle . |
| 4,061,213 | 12/1977 | Davy . |
| 4,120,385 | 10/1978 | Roider . |
| 4,625,838 | 12/1986 | Hopes . |
| 4,698,536 | 10/1987 | Oohori . |

OTHER PUBLICATIONS

*Introducing an Anti-Lock Braking System Whose Time has Come*, 1988, Freightliner Corporation, WABCO, Anti-Lock Braking System.

*Primary Examiner*—Douglas C. Butler
*Attorney, Agent, or Firm*—Klarquist, Sparkman, Campbell, Leigh & Whinston

[57] ABSTRACT

This invention relates to a hub assembly used on axles of a motor vehicle which has an anti lock braking system. The hub assembly consists of a ferrous exciter ring having toothed projections thereon. The exciter ring is cast integral with a hub. The integral cast hub results in a strong assembly that virtually eliminates the possible loosening of the hub and exciter ring, which can result in failure of the device. Also, precision machining of the components is not necessary to permit their assembly. A pick up senses the teeth of the exciter ring as the teeth pass the sensor to detect the relative rotational velocity of the motor vehicle wheel.

11 Claims, 3 Drawing Sheets

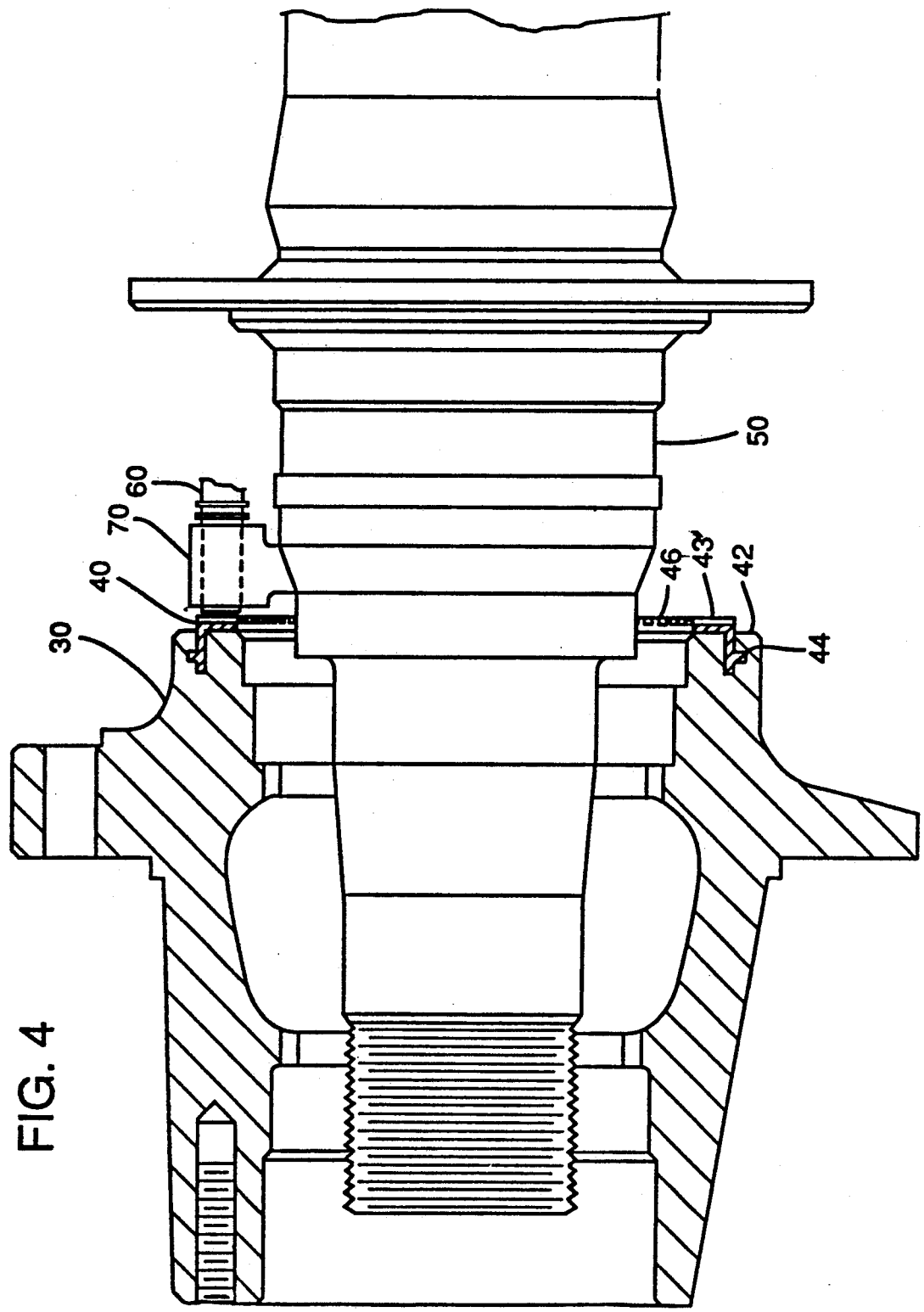

HUB AND EXCITER RING ASSEMBLY

BACKGROUND OF THE INVENTION

Anti-lock braking systems for vehicles including automobiles, aircraft, railways and trucks have been used for a number of years. The need for such systems is especially acute in the trucking field, especially for articulated trucks to prevent loss of control which could cause jackknifing on slippery road surfaces during braking.

Many types of anti-lock braking systems utilize a sensing device which constantly monitors wheel speed and produces signals representative of the wheel speed which are sent to a logic portion of the system. The logic portion calculates rotational speed and acceleration or deceleration of the wheel to determine impending wheel lock and therefore potential skid situations. The system further comprises modulating valves which, when actuated, regulate braking fluid pressure. The logic unit modulates the valves based upon the relative rotational speed of the wheels to maintain maximum braking pressure without inducing wheel lock.

The most popular type of sensing device is a magnetic pickup which is actuated by an exciter ring. The exciter ring is a ring structure with teeth projecting from one face. The exciter ring is mounted on a hub assembly which rotates. The magnetic pickup is mounted adjacent to the exciter ring on a non rotating member such as an axle support or housing. Each time one of the teeth of the exciter ring passes the magnetic pick up, an electrical pulse is generated. The logic portion of the anti-lock braking system can analyze these pulses to determine the acceleration or deceleration rate of the rotating wheel and thereby send any correction signals required to the modulating valves.

The spacing between the exciter ring and the magnetic pick up is extremely critical. Should the gap between the sensor or pick up and the exciter ring vary, due to out of roundness or eccentricity of the exciter ring, the sensor may fail to read the interruptions or teeth of the exciter ring. This will cause the sensor to mistakenly indicate to the logic component of the anti-lock braking system that the associated wheel has locked and a skid is occurring. The logic component of the system may then release braking pressure on that wheel, thereby unnecessarily lowering the braking effectiveness of that wheel.

A common prior art method of attaching the exciter ring to the hub is by a press fit which requires precision machining the hub and precision machining the exciter ring. The hub can be cooled and the exciter ring heated prior to assembly. Referring to FIG. 1 a hub 10 is machined on surface 12. Both the diameter and the depth of the flat is machined. The exciter ring 20 is machined on the inside surface 28 for both diameter and depth and on the face of the teeth 24. The exciter ring 20 was then press fitted in an interference relationship onto hub 10. Although this method was successful, the cost of machining was excessive and the potential existed for the exciter ring to loosen from the hub.

The present invention overcomes the cost of machining and potential loosening by casting the exciter ring integral with the hub.

BRIEF SUMMARY OF THE INVENTION

It is an object of the invention to provide a hub assembly for an anti-lock braking system which has a toothed exciter ring cast integral with a hub.

It is also an object of the invention to produce an assembly to detect rotational speed, acceleration and deceleration of a vehicle wheel by means of an exciter ring cast integral with a hub and a sensor mounted in close proximity to the exciter ring.

In its broadest aspect, the present invention comprises a hub assembly with an exciter ring which is cast integral with the hub, the exciter ring forming a part of an anti-lock braking system for a vehicle.

In a specific embodiment of the invention, an exciter ring of ferrous material has a flat face with teeth upstanding from the face. A wall, perpendicular to the face containing the teeth is integral with the ring, circumferential to the outside periphery of the ring. Projections protrude from the wall at right angles to the wall, parallel to the plane of the teeth. The projections are equally spaced about the periphery of the wall. The exciter ring is cast integral to a hub. The ring is cast on an inner surface of the hub. The inner surface of the hub circumscribes an axle and lies in a plane perpendicular to the axle. The teeth of the ring project beyond the inner surface of the hub. A magnetic pick up is housed in a fixed support projecting from the axle support such that the face of the magnetic pick up is in close proximity to the teeth of the exciter ring. The magnetic pick up produces an electrical signal each time one of the teeth of the exciter ring passes the pick up.

Other features, objects and advantages of the present invention will be apparent from the following description of a preferred embodiment thereof and from the attached drawings.

BRIEF DESCRIPTION OF THE DRAWINGS

FIG. 4 is a cross sectional view of the hub and exciter ring assembly of FIG. 2 shown assembled on an axle with the sensor and sensor support shown.

DETAILED DESCRIPTION OF PREFERRED EMBODIMENTS

Figure 1:
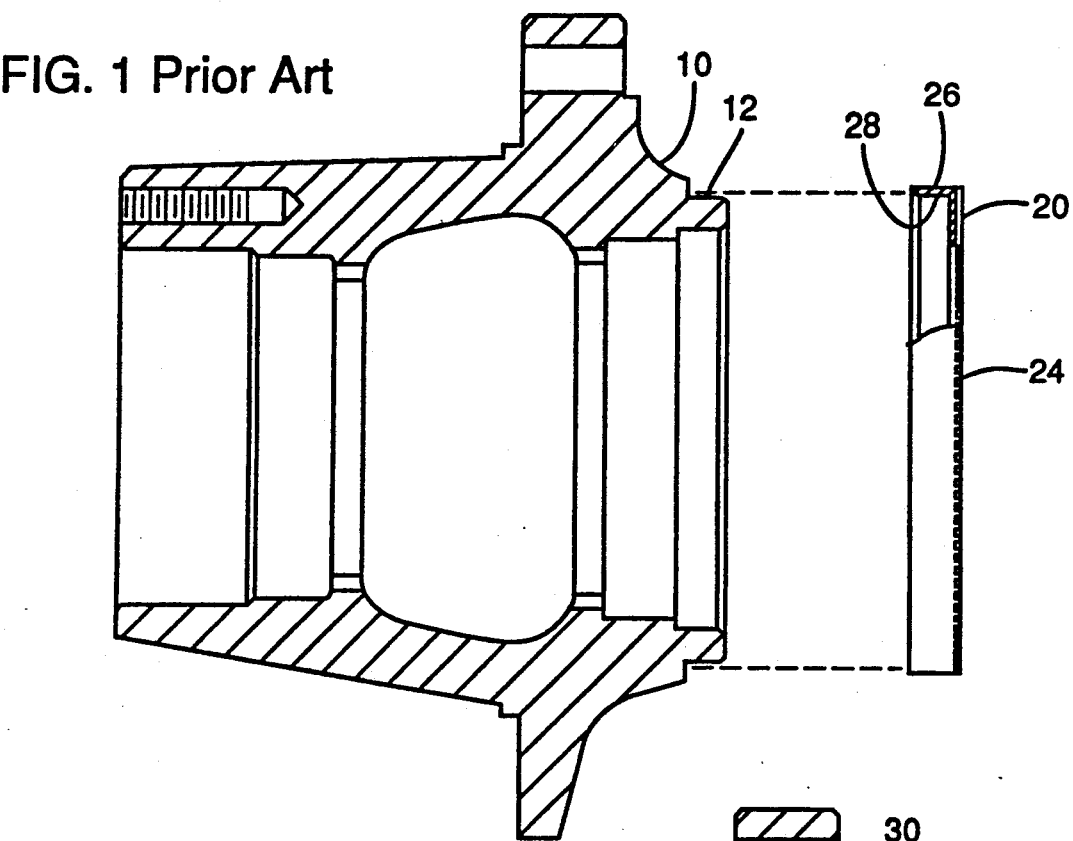
FIG. 1 is a cross section of a prior art hub with a partial cross section of the exciter ring which is to be pressed in place on the hub.
Figure 2:
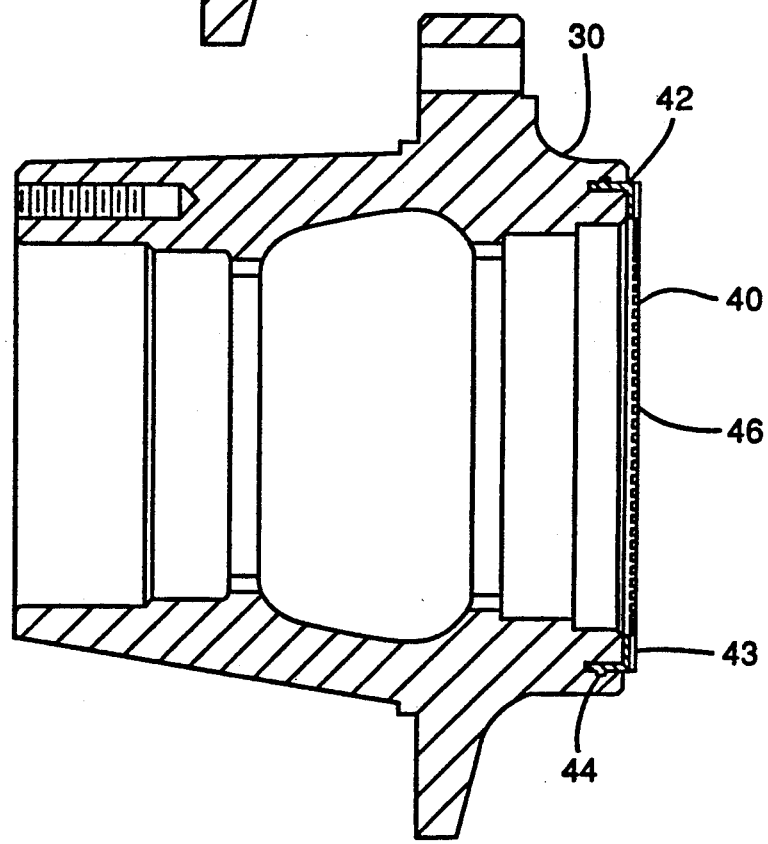
FIG. 2 is a cross sectional view of one form of a hub and exciter ring assembly of the present invention.

Referring to FIG. 2 a cast metal hub 30 is shown in cross section. Exciter ring 40 is shown cast integral with hub 30 with teeth 46 extending beyond the casting. Because the exciter ring used in the present invention need not be machined prior to casting, a host of different and less expensive manufacturing techniques may be used to manufacture the exciter ring thus lowering its cost. The exciter ring of the present invention may be sand cast, investment cast, or formed of powdered metal rather than machined. Exciter ring 40 has wall 42 integral with the ring about the circumference of flat face 43 of exciter ring 40. Projections 44 are outstanding from wall 42, perpendicular to wall 42 and lying in a plane parallel to the plane of flat face 43. Teeth 46 are projecting from the flat face 43.

Figure 3:
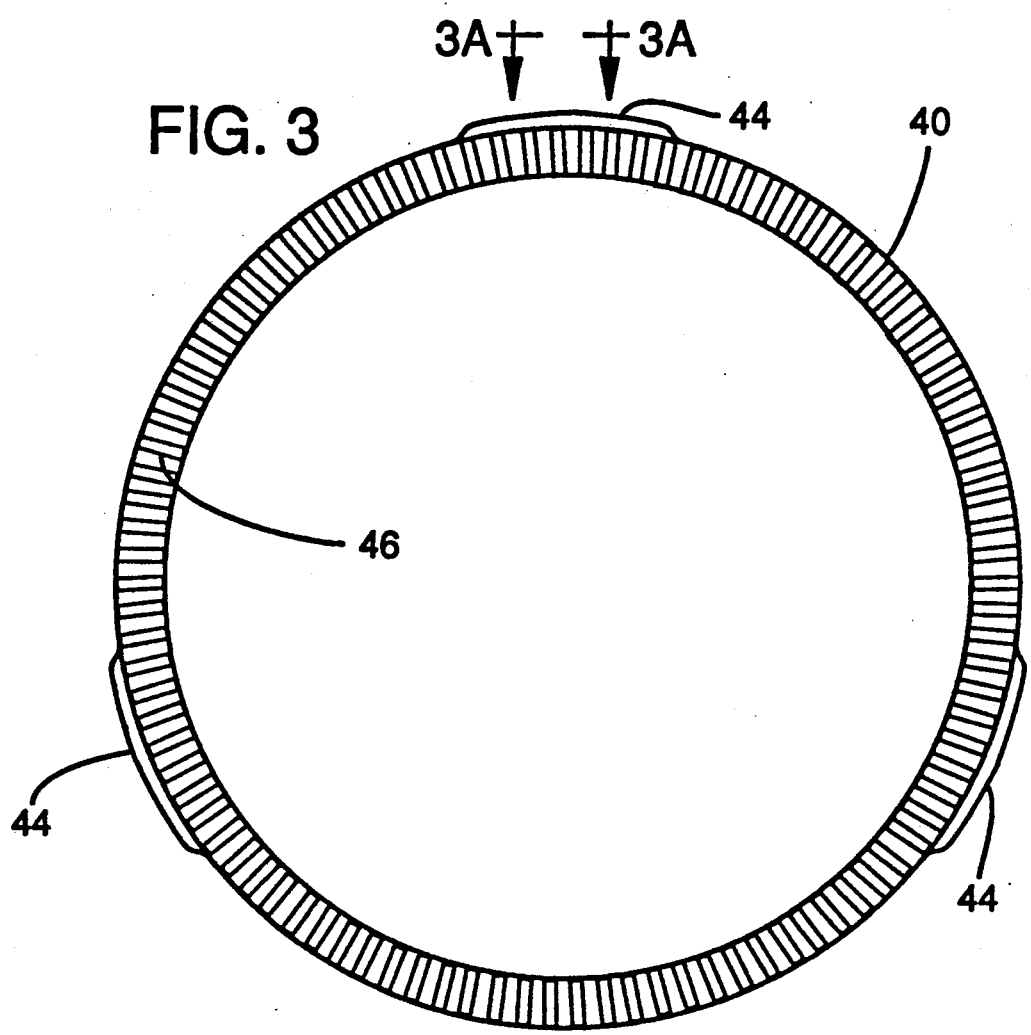
FIG. 3 is a plan view of the exciter ring of FIG. 2.
Figure 3A:
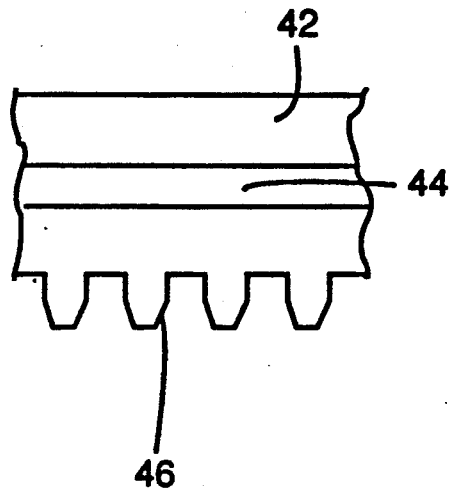
FIG. 3A is a partial side view of the exciter ring in direction of arrows 3A—3A of FIG. 3.

FIG. 3 provides a better representation of the exciter ring 40. Projections 44 are shown in this figure as being equally spaced about the periphery of exciter ring 40. FIG. 3A is a partial side view of this embodiment showing wall 42, projection 44 and teeth 46 in better detail. The purpose of projections 44 is to lock the exciter ring in the casting to prevent any movement relative to hub 30.

FIG. 4 shows the hub assembly of hub 30 and exciter ring 40 mounted on axle 50. The axle may be fixed as shown in FIG. 4 or it may be driven wherein hub 30 would be fixed to the axle. Also shown is a magnetic pick up 60 which is held in a non rotating member 70. Holder 70 may be a part of the axle support. The front face of pick up 60 is adjacent flat face 43 of exciter ring 40 and senses teeth 46 as they pass pick up 60. Pick up 60 produces an electrical pulse each time tooth 46 passes the pick up. The electrical pulses produced by the pick up or sensor 60 are sent to a logic unit (not shown) as is known in the art where the logic unit translates these pulses into command signals to control the braking pressure on that wheel.

Although a preferred embodiment with teeth 46 extending beyond the casting has been shown, an alternate embodiment has been found to work equally as well. Teeth 46 of exciter ring 40 project beyond the casting material of hub 30 in the preferred embodiment. This is necessary if the hub 30 were formed of a ferrous material. It has been found that, if aluminum alloy, magnesium alloy or other nonferrous metals are used to cast hub 30, then the casting metal can be allowed to completely encapsulate teeth 46 of exciter ring 40. The exposed surface of the hub 30 is then surface machined such that the tips of teeth 46 are exposed. This machining operation can be inexpensive, for example, disk operation. Moreover, the exposed surface of the completed assembly is typically machined anyway so that this does not typically require an additional manufacturing step. The aluminum or other nonferrous hub material between teeth 46 does not degrade the performance of the pick up. This alternate embodiment also prevents dirt, sand and small pebbles from becoming lodged between teeth 46. Also, the hub material between the teeth helps to lock the ring in place.

Obviously, many modifications and variations of the present invention are possible in light of the above teachings. It is therefore to be understood that with the scope of the appended claims, the invention may be practiced otherwise than as specifically described.

I claim:

1. A wheel hub assembly for use in an anti-lock brake application comprising:
    a cast hub;
    a ferrous exciter ring having a projecting wall cast integral with the hub so as to embed the exciter ring projecting wall within the hub without precision machining to form a strong integral cast hub assembly which virtually eliminates the possible loosening of the hub and exciter ring which can result in failure.

2. The wheel hub assembly as recited in claim 1 wherein the hub is cast of nonferrous alloy.

3. The wheel hub assembly as recited in claim 1 wherein the hub is cast of a material selected from the group consisting of aluminum alloy and magnesium alloy.

4. The wheel hub assembly as recited in claim 1 wherein the exciter ring has uniformly spaced teeth projecting therefrom beyond the surface of the hub casting.

5. The wheel assembly as recited in claim 1 wherein the exciter ring has a plurality of radially outstanding projections about the circumference thereof to embed the periphery of the exciter ring into the hub casting.

6. A hub assembly for a motor vehicle having an axle with a longitudinal centerline and/or anti-lock braking system comprising:
    a cast hub for attachment to the axle of the vehicle;
    the hub having an inner surface perpendicular to the longitudinal centerline of the axle;
    an exciter ring of ferrous metal having a surface with teeth formed thereon and a wall perpendicular to the toothed surface about the outside periphery of the ring;
    protrusion s radially projecting at right angles to the wall of the ring about the periphery of the ring;
    the protrusions being equally spaced about the periphery of the ring; and
    the exciter ring cast integral with the hub on the inside surface of the hub without precision machining to form a strong integral cast hub assembly which virtually eliminates the possible loosening of the hub and exciter ring which can result in failure.

7. A hub assembly as recited in claim 6 wherein the hub is cast of a nonferrous alloy.

8. A hub assembly as recited in claim 6 wherein the hub is cast of a material selected from the group consisting of aluminum alloy and magnesium alloy.

9. A wheel sensor for an anti-lock braking system of a vehicle with an axle comprising:
    a hub assembly mounted on a vehicle axle;
    the hub assembly comprising a metallic cast hub having an inner surface perpendicular to the axle;
    the inner surface circumscribing the axle adjacent the axle;
    an exciter ring of ferrous metal having toothed projections thereon cast integral with the inner surface of the hub without precision machining such that the teeth project beyond the inner surface of the hub to form a strong integral cast hub assembly which virtually eliminates failure from the possible loosening of the hub and exciter ring; and
    a magnetic pickup rigidly attached to an axle support adjacent to the toothed projection of the exciter ring to detect each tooth of the exciter ring as the teeth rotate past the pick up.

10. A method of producing a hub for an anti-lock braking system comprising the steps of:
    producing a ferrous metallic exciter ring having toothed projections upstanding form a face of the ring; and
    casting the exciter ring without precision machining into a hub such that the teeth of the exciter ring are coincidental with or extend beyond an inner surface of the hub to produce a strong integral cast hub assembly which virtually eliminates the possible loosening of the hub and exciter ring which can result in failure.

11. An exciter ring for an anti-lock braking system having an integral cast hub, the exciter ring comprising:
    a circular ring of ferrous material having a surface with teeth formed thereon;
    a wall perpendicular to the toothed surface about the periphery of the ring; and
    protrusions radially projecting outwardly at right angles to the wall of the ring about the periphery of the ring to integrally embed the exciter ring in the hub to form without precision machining a strong integral cast hub assembly which virtually eliminates failure from the possible loosening of the exciter ring from the hub.

* * * * *